(12) United States Patent
Lin

(10) Patent No.: US 6,883,621 B1
(45) Date of Patent: Apr. 26, 2005

(54) POWER SUPPLY STRUCTURE OF ELECTROMOTIVE TOOL

(76) Inventor: Jack Lin, 235 Chung-Ho Box 8-24, Taipei (TW)

( * ) Notice: Subject to any disclaimer, the term of this patent is extended or adjusted under 35 U.S.C. 154(b) by 0 days.

(21) Appl. No.: 10/753,186

(22) Filed: Jan. 5, 2004

(51) Int. Cl.[7] ............................................. H02J 7/00
(52) U.S. Cl. .................. 173/217; 173/171; 310/50; 318/254; 318/701
(58) Field of Search ............... 173/117, 2, 217, 173/171, 20; 310/47, 50; 318/254, 701, 439, 318/492; 363/80, 142, 285

(56) References Cited

U.S. PATENT DOCUMENTS

| | | | | |
|---|---|---|---|---|
| 3,201,742 A | * | 8/1965 | English | 439/500 |
| 3,550,280 A | * | 12/1970 | Palm | 30/217 |
| 3,757,194 A | * | 9/1973 | Weber et al. | 320/112 |
| 4,196,469 A | * | 4/1980 | Gurwicz | 363/131 |
| 4,694,194 A | * | 9/1987 | Hansel et al. | 307/66 |
| 4,835,410 A | * | 5/1989 | Bhagwat et al. | 307/64 |
| 4,943,902 A | * | 7/1990 | Severinsky | 363/80 |
| 5,513,709 A | * | 5/1996 | Fisher | 173/205 |
| 5,715,156 A | * | 2/1998 | Yilmaz et al. | 363/142 |
| 6,286,609 B1 | * | 9/2001 | Carrier et al. | 173/1 |
| 6,536,536 B1 | * | 3/2003 | Gass et al. | 173/2 |

* cited by examiner

Primary Examiner—Scott A. Smith

(57) ABSTRACT

A power supply structure of an electromotive tool comprises a body and a transformer. The body comprises a clamp at one end of the body; and an electromotive motor for driving the clamp to rotate; a control button installed at one lateral side of the body for controlling the electromotive motor; a battery seat being installed at another end of the body; the battery seat containing a battery and a control circuit; the control circuit having an inserting hole; an over current protection device of a charging circuit; and a switch; a transformer inserting into the inserting hole. By switching the switch of the control circuit to select an external power supply and a battery power supply. The control circuit serves for actuating the electromotive motor and charging the battery and the over current protection device serves to monitor the charging current so as to protect the battery.

4 Claims, 6 Drawing Sheets

POWER SUPPLY STRUCTURE OF ELECTROMOTIVE TOOL

FIELD OF THE INVENTION

The present invention relates to a power supply structure, and particular to an electromotive tool which can store electrical energy.

BACKGROUND OF THE INVENTION

The prior art electromotive tool has power supplied by connecting wire to a power supply. However, this is inconvenient and thus chargeable electromotive tool with batteries is design to improve the prior art defect.

The prior art chargeable electromotive tool includes a plug-in tool and a battery seat. A top of the tool has a transversal operation portion. One end of the portion is a clamp for clamping a tool head. Another end is downward extended with a longitudinal handle. A bottom of the hollow handle has an inserting end which extends with the operation portion for assembling the battery seat.

The interior of the seat body of the battery seat has a battery, a transformer, and a charging circuit. One end of the seat body is protruded with an inserting post for inserting into the handle. A side of the inserting post has a conductive sheet. When it is inserted into a tool, it will contact the electrode in the tool. Two sides of the seat of the battery seat have respective buckles. In assembly, the inserting post of the battery seat will be inserted into the handle of the tool. Then palms of the buckles at the inner side of the inserting end of the tool serve to fix it. The battery seat further has a power hole for receiving a power wire. When external power is necessary, the power wire can be inserted into the power hole and a receptacle on the building. Then power will supply to the battery from the receptacle. If it is unnecessary to supply power from outside, the power wire can be pulled out from the hole.

When the electromotive tool is used, a switch at one side of a handle is pressed for actuating the motor. When it is desired to change the rotation speed of the electromotive motor, a switching key near an operation portion of the handle is used.

However, above said prior art has the following disadvantages.

When power is supplied to the prior art electromotive tool externally, the battery in the battery seat can not be charged. Moreover, the battery seat and the operation portion of the tool extend along the same direction. The battery seat is installed with a battery, a transformer, a charging circuit, etc. and thus the volume of the battery seat is slightly smaller than the operation portion. When the tool is operated along a wall or a box body, no bad effect is induced, but when it is used in a concave portion and protrusions are at a periphery of the concave portion, the battery seat is easy to touch the protrusion so that it cannot be operated.

In the prior art, the battery seat is installed with a transformer. Since cores and windings are installed in the battery seat so that the weight and volume are larger. Since the electromotive tool is held by one hand and thus it is heavy, the user cannot hold it easily for operation. Thus efficiency and quality of the work are reduced. Or the hand of the user will feel ache.

In the prior art electromotive tool, when the power wire is inserted into a power supply receptacle for supplying power externally. No sliding preventing structure is installed at the connection of the power wire and the electromotive tool. Thereby, it is easily dropped downward so as to interrupt the power. This is troublesome to the user.

In another prior art, the power wire and charging circuit are externally arranged for reducing the volume and weight of the battery seat so that when the power supply of the electromotive tool is mainly from the battery seat, the operation will not be interrupted by the heavy battery seat. However, this kind of prior art still has the following disadvantages.

The cost is high due to the independent charger and the manufacturing process is increased. Thereby, the cost is high. Thereby, the separated charger easily loses due to the disorder work place. Thereby, one more charger is necessary. This is a trouble to the users.

Thereby, in charging, the charger is connected to the battery seat so that the electromotive motor cannot work.

SUMMARY OF THE INVENTION

Accordingly, the primary object of the present invention is to provide a power supply structure of an electromotive tool which comprises a body and a transformer. The body comprises a clamp at one end of the body; and an electromotive motor for driving the clamp to rotate; a control button installed at one lateral side of the body for controlling the electromotive motor; a battery seat being installed at another end of the body; the battery seat containing a battery and a control circuit; the control circuit having an inserting hole; an over current protection device of a charging circuit; and a switch; a transformer inserting into the inserting hole. By switching the switch of the control circuit to select an external power supply and a battery power supply. The control circuit serves for actuating the electromotive motor and charging the battery and the over current protection device serves to monitor the charging current so as to protect the battery.

Moreover, in the present invention, the control circuit has an LED control loop, when the battery is charged, the LED control loop controls at least one LED to light up. A slide-preventing structure is installed at an connection of the transformer and the electromotive motor.

Furthermore, the sliding-prevent structure has a hole and a connecting end of the transformer; two lateral side of the hole are formed with respective longitudinal buckling groove; and an inner center of the buckling groove has a recess; the connecting end of the transformer has a buckling plate; a protrusion is formed at each of two long opposite sides of the connecting end; when the buckling plate is embedded into the hole, the buckling plate is rotated through 90 degrees so that the buckling plate is buckled into the longitudinal buckling grooves and each protrusion is buckled in a respective recess.

The various objects and advantages of the present invention will be more readily understood from the following detailed description when read in conjunction with the appended drawing.

DETAILED DESCRIPTION OF THE INVENTION

Figure 1:
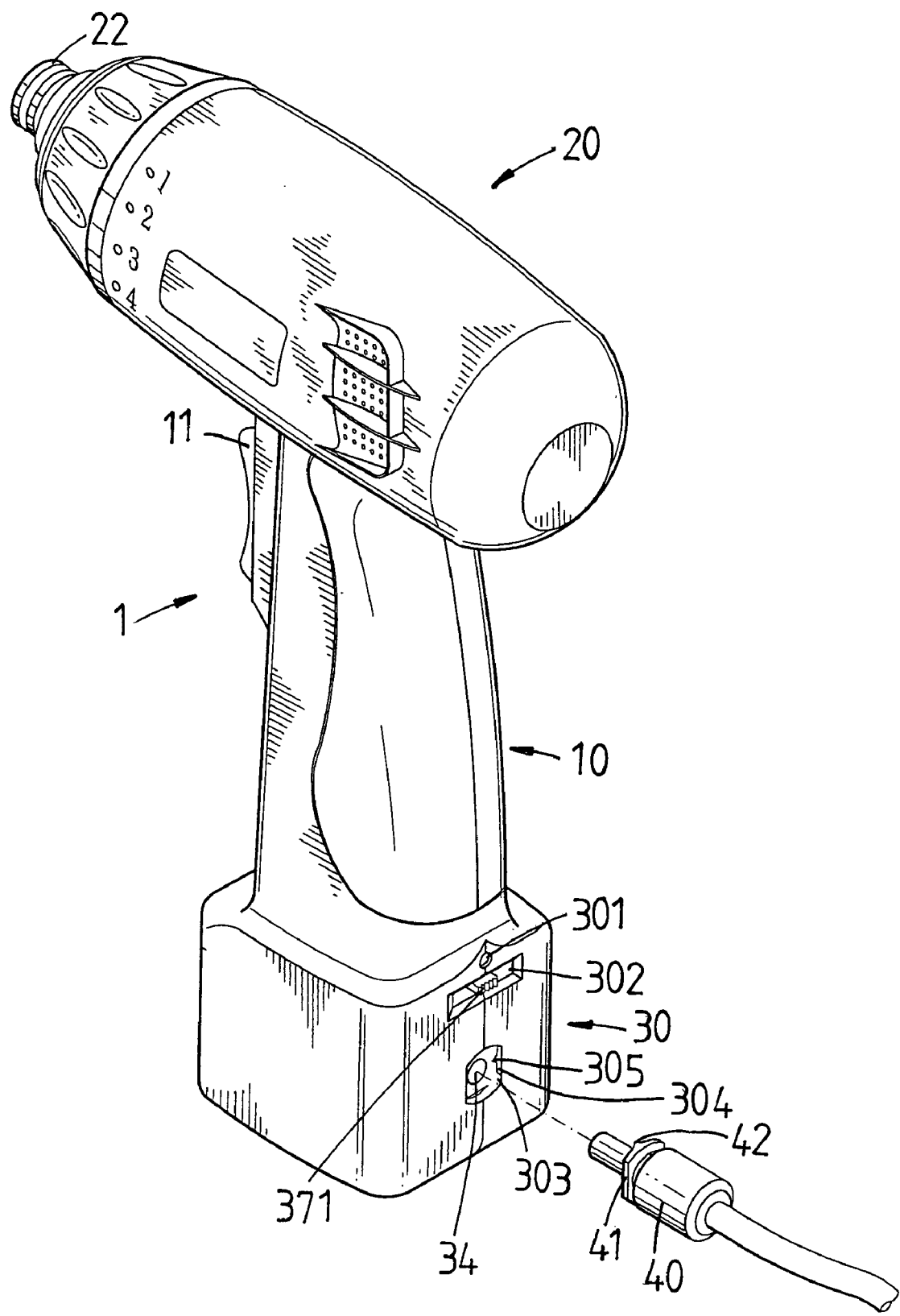
FIG. 1 is a structural perspective view of the power supply structure of an electromotive tool according to the present invention.
Figure 2:
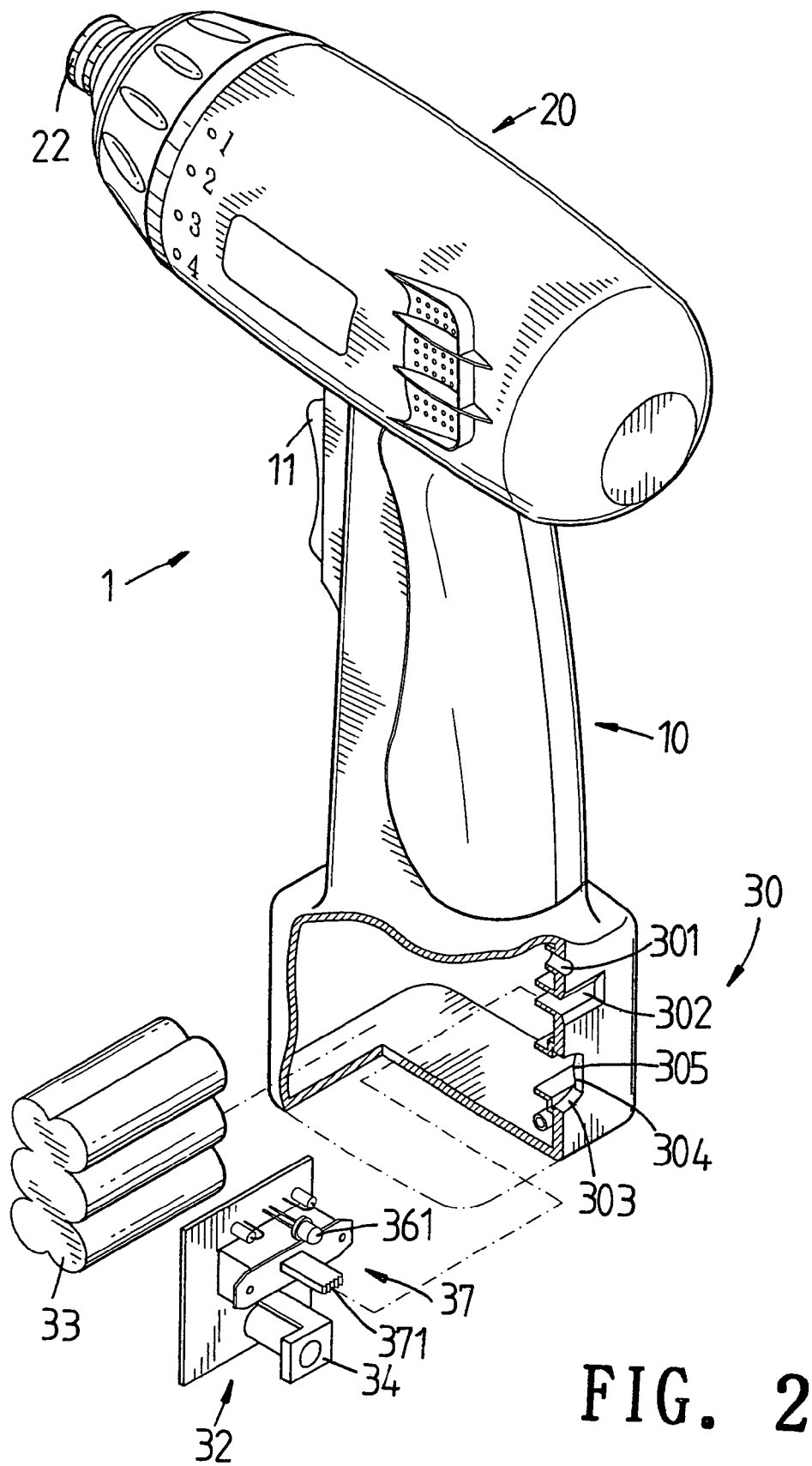
FIG. 2 is a partial exploded view of the power supply structure of an electromotive tool according to the present invention.
Figure 3:
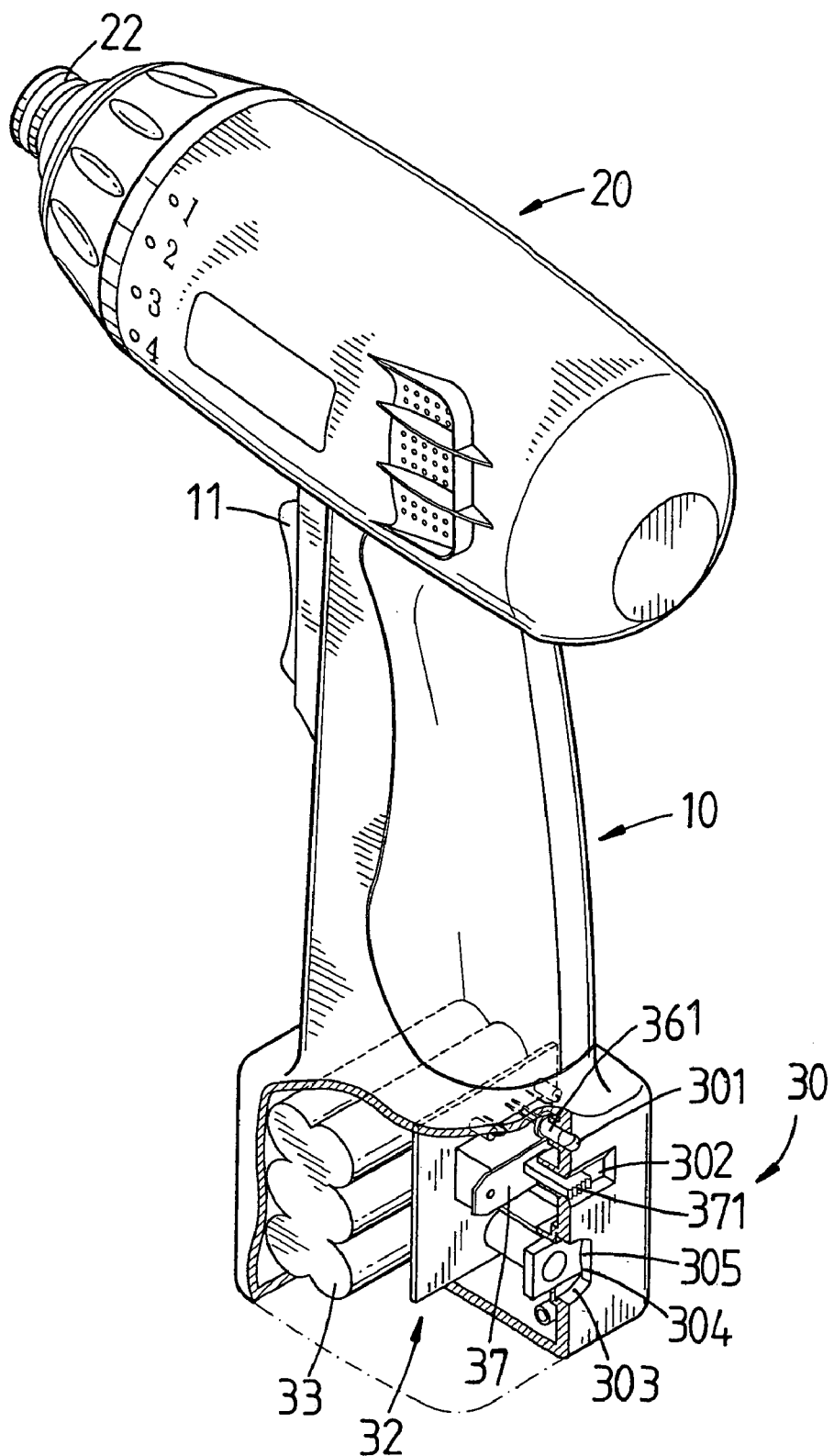
FIG. 3 is a perspective view about the structure of the power supply structure of an electromotive tool of the present invention.
Figure 4:
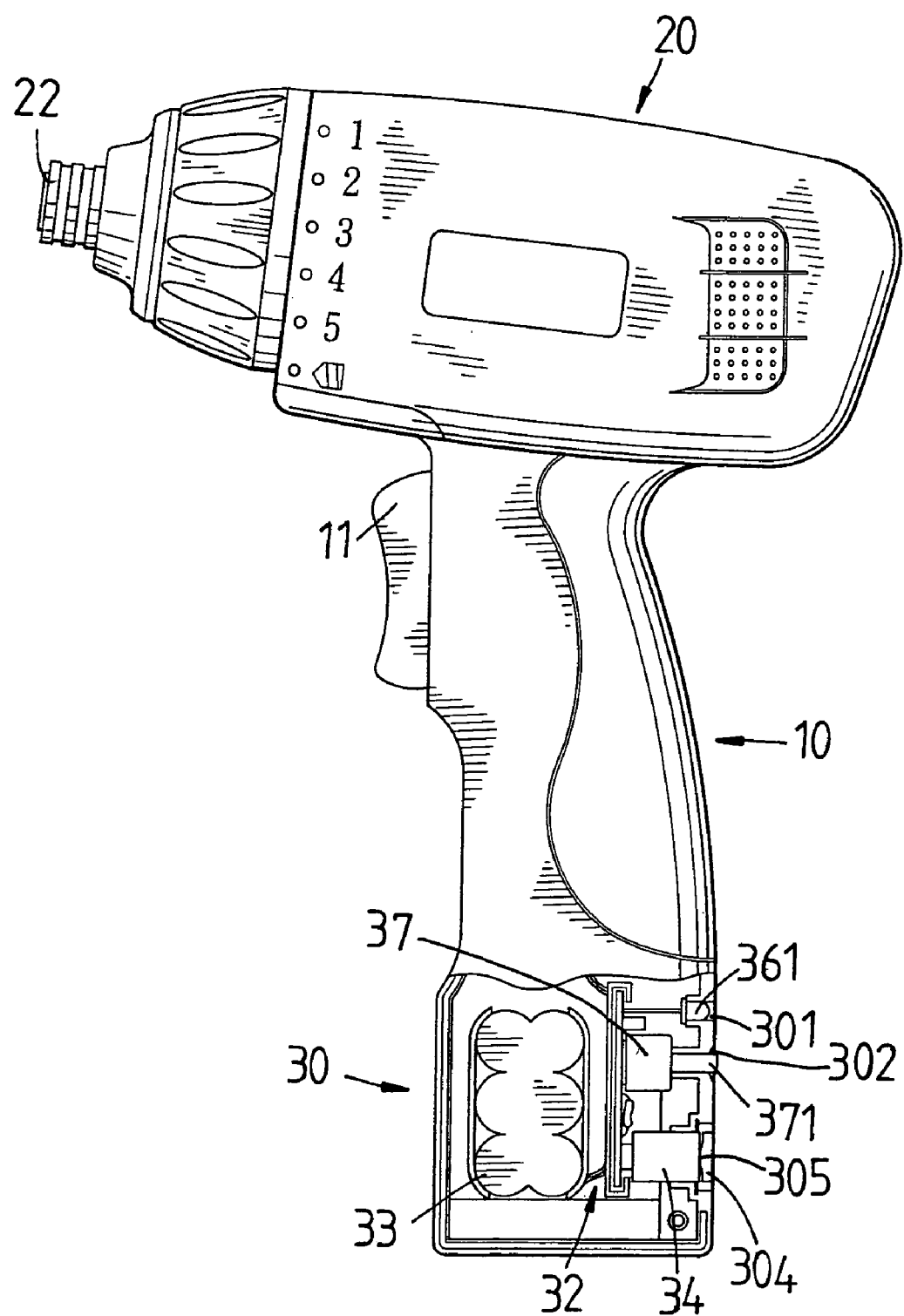
FIG. 4 is a lateral perspective view of the power supply structure of an electromotive tool of the present invention.

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Referring to FIGS. 1 to 4, the power supply structure of an electromotive tool of the present invention is illustrated. The electromotive tool 1 includes a body and a transformer. The body has a holding portion 10. A top of the holding portion 10 is transversally installed with an acting portion 20 and has a battery seat 30 at a bottom side of the holding portion 10.

The acting portion 20 is a hollow casing having a predetermined shape. An electromotive motor (not shown) is firmly secured to an interior of the casing. The electromotive motor may drive a clamp 22 at a front end of the motor. The clamp 22 serves to clamp different tool head. A user can hold the holding portion 10. A control button 11 is installed on the holding portion 10. The control button 11 serves to controlling the rotary speed and the rotary orientation of the electromotive motor. Above said acting portion 20 and holding portion 10 are known in the prior art and thus the details will not be described herein.

The battery seat 30 is a hollow casing. One end of the surface thereof is installed with an LED lamp hole 303, a trench 302 and a buckling slot 303 having an approximate elliptical shape. A control circuit 32 is pivotally installed in an interior of the battery seat 30. A battery 33 connected to the control circuit 32 is installed in the interior of the battery seat 30. An output end of the control circuit 32 is installed with a motor control circuit (not shown) and a motor protection device (not shown). Moreover, the control circuit 32 is connected to the electromotive motor. The motor control circuit and the motor protection device are known in the prior art and are not the main concern of the present invention. Thereby, the details will not be described here. The control circuit 33 includes an inserting hole 34 of a transformer, an over current protection device 35 of a charging loop, an LED control loop 36 and a switch 37.

In the present invention, a slide-preventing structure is installed at an connection of the transformer and the electromotive motor.

The inserting hole 34 serves to be connected to a transformer for locating a transformer to a power supply receptacle of a building. Then a connecting end 40 of the transformer inserts into the buckling slot 303 of the battery seat 30 and then is inserted into the inserting hole 34. Since the appearance of the buckling slot 303 has an approximately elliptical shape. One outer side of the buckling slot 303 is formed with longitudinal buckling groove 304. Two lateral sides of buckling groove 304 are formed with a "<" shape portion 305. A connecting end 41 of the transformer is installed with a buckling plate 41. The buckling plate 41 has an approximate elliptic shape corresponding to the shape of the buckling slot 303. Two longer sides of buckling plate 41 have respective protrusions 42. When the buckling plate 41 of the connecting end 40 is inserted into the buckling slot 303 longitudinally. The connecting end 40 will rotate through 90 degrees so that the buckling plate 41 is buckled in the buckling groove 304. The protrusions 42 of the buckling plate 41 are buckled to the portions 305.

The over current protection device 35 used for charging loop is a unidirectional current loop for protecting the battery and system so that they will not be destroyed by a too large current.

The LED control loop 36 is a unidirectional loop. LEDs 361 are installed on the LED control loop 36. If the battery is charged, the LEDs 361 on the LED control loop 36 will light up. When the power of the battery is saturated, the LEDs 36 will extinguish so that the user can know the power storage in the battery.

The switch 37 has a switch button 317 which protrudes from the trench 302 of the battery seat 30 for switching the power supply of the battery. There are two modes for power supply, one is from battery, and the other is from external power supply through the transformer.

Figure 5:
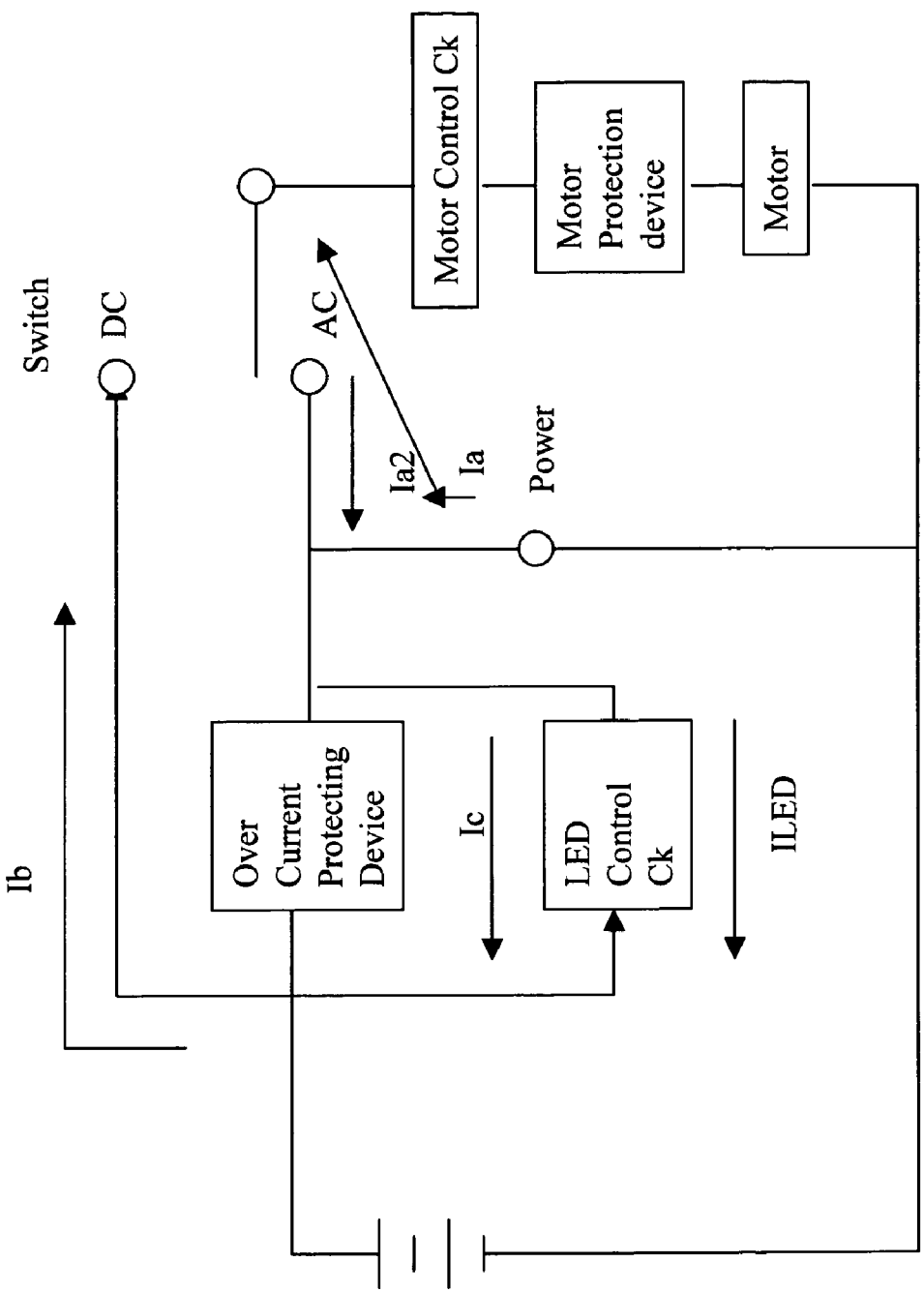
FIG. 5 shows the circuit of the power supply structure of an electromotive tool of the present invention.
Figure 6:
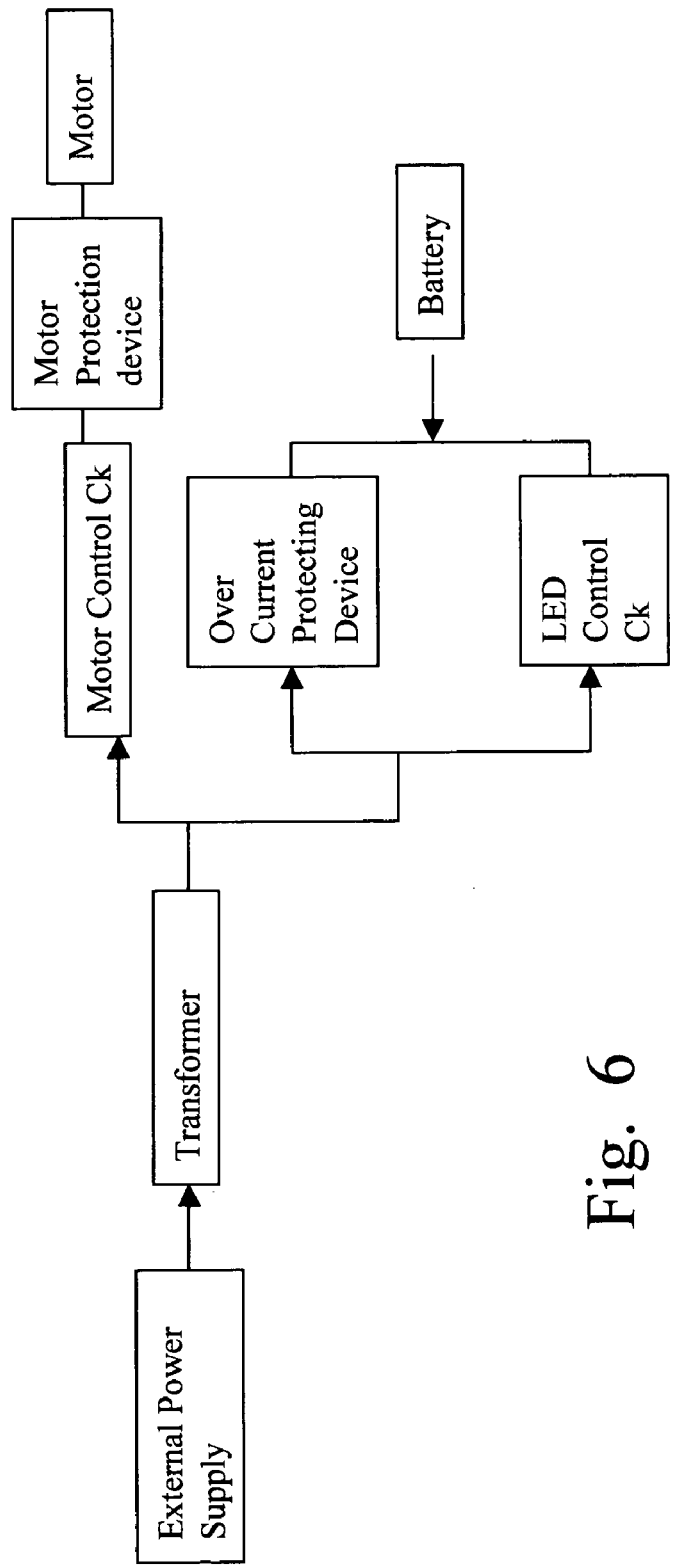
FIGS. 6 and 7 show the block diagrams of the power supply structure of an electromotive tool of the present invention.

In the operation of the present invention, when the connecting end 40 of the transformer is inserted into the inserting hole 34 of the transformer, and power is supplied externally by the selection from the switch 37, as shown in FIGS. 5 and 6, the power from the control circuit 32 to the electromotive motor is supplied from the inserting hole 34 of the transformer. The inserting hole 34 provides power Ia which is the summation of current Ia1 and current Ia2. The current Ia2=current Ia+ current ILED. The current IA is outputted to the motor.

The current IA2 connected in parallel with the current Ia1 is used for charging the battery. The current is divided into two parts, one current Ic is supplied to the over current protection device 35 and the other current Ia2 is parallel connected with the current Ic. Thereby, the over current protection device 35 can supply current to the battery and monitor power supply. The current ILED flowing through the LED control loop 36 has a larger resistance. Thus, the current only acquires a minor current from the current Ia2 and thus make no effect to the charge of the battery. The LED control loop 36 serves to determine whether the batty is in saturation state. If not, the LEDs on the LED control loop 36 will flash until the battery is in saturation state, the LEDs extinguishes. The over current protection device 35 and the LED control loop 36 are installed with diodes for providing feedback of current of the battery so as to assure the current of the battery is only supplied to the electromotive motor for rotating the motor.

Since current Ia=current Ia1+current Ia2. When the motor is in use, the current Ia1 become larger and thus, the current Ia2 parallel connected to the current Ia1 will become small. This represents that charging current is reduced. It only prolongs the charging time period, but has no effect to the lifetime of the battery.

Figure 7:

Referring to FIGS. 5 and 7, when the switch 37 is pressed to select power supply from the battery, since the over current protection device 35 and the LED control loop 36 are unidirectional loop, only current Ib is outputted from the battery. The current Ib serves to actuate the rotation of the motor. If the switch 37 is at a state that power is provided by the battery and the inserting hole 34 of the transformer is still inserted with the connection end of the transformer, when the power of battery is almost used up, the voltage of the battery will reduce greatly so that the voltage decrement at two ends of the current Ic will enlarge. At this condition, the over current protection device 35 will suppress the current Ic so that the current Ic is retained in an allowable range of the circuit loop. Thereby, the loop will not be destroyed due to over current.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A power supply structure of an electromotive tool comprising
   a body comprising:
   a clamp at one end of the body; and
   an electromotive motor for driving the clamp to rotate;
   a control button installed at one lateral side of the body for controlling the electromotive motor;
   a battery seat being installed at another end of the body; the battery seat containing
   a battery;
   a control circuit having an inserting hole;
   a switch for selecting an external power supply and a battery power supply so as to perform at least one operation; the operation being at least one of initiating a power supply to supply power to the electromotive tool and charging the battery;
   an over current protection device of a charging circuit for monitoring the charging current to protect the battery from over-current; and
   a transformer inserting into the inserting hole for supplying external power into the body;
   wherein by switching the switch of the control circuit to select an external power supply and a battery power supply for supplying power to the body; the control circuit serves to divide an external current for actuating the electromotive motor and charging the battery.

2. The power supply structure of an electromotive tool as claimed in claim 1, wherein the control circuit has an LED control loop, when the battery is charged, the LED control loop controls at least one LED to light up.

3. The power supply structure of an electromotive tool as claimed in claim 1, wherein a slide-preventing structure is installed at a connection of the transformer and the electromotive motor.

4. The power supply structure of an electromotive tool as claimed in claim 3, wherein the sliding-prevent structure has a hole and a connecting end of the transformer; two lateral sides of the hole are formed with respective longitudinal buckling groove; and an inner center of the buckling groove has a recess; the connecting end of the transformer has a buckling plate; a protrusion is formed at each of two long opposite sides of the connecting end; when the buckling plate is embedded into the hole, the buckling plate is rotated through 90 degrees so that the buckling plate is buckled into the longitudinal buckling grooves and each protrusion is buckled in a respective recess.

* * * * *